W. E. PORTER.
CUSHIONED WHEEL.
APPLICATION FILED JUNE 29, 1916.
1,295,593.
Patented Feb. 25, 1919.
2 SHEETS—SHEET 1.
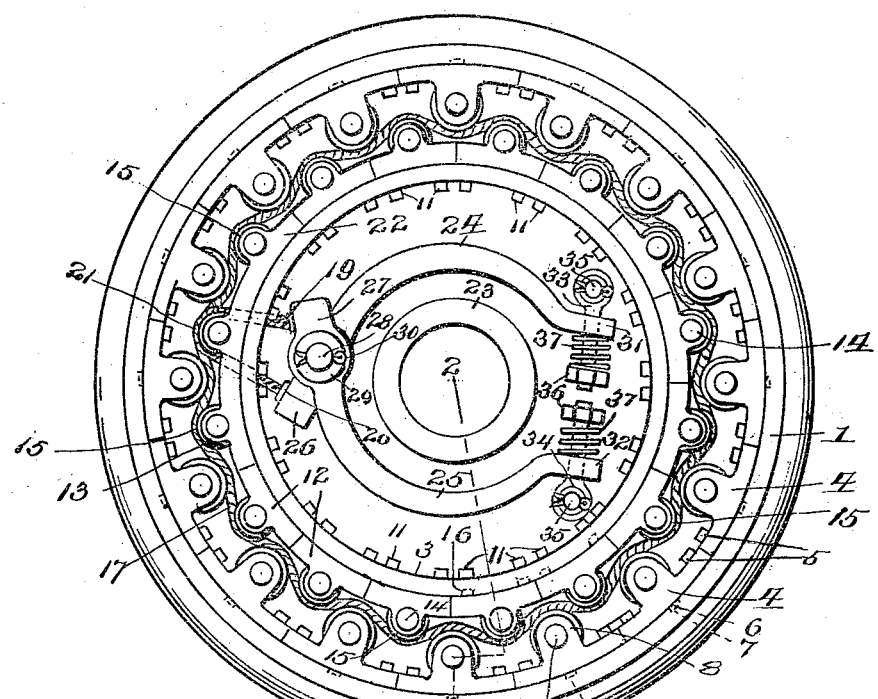
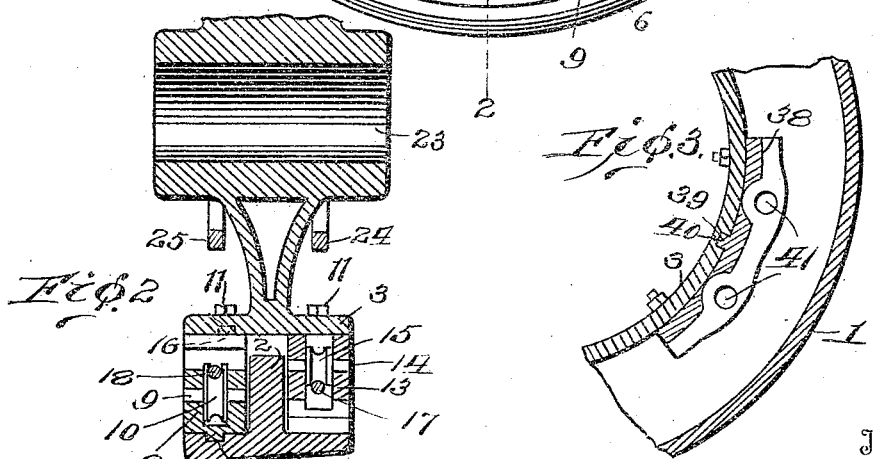
Witnesses
J. M. Fowler Jr.
Inventor
W. E. Porter
By
Attorney

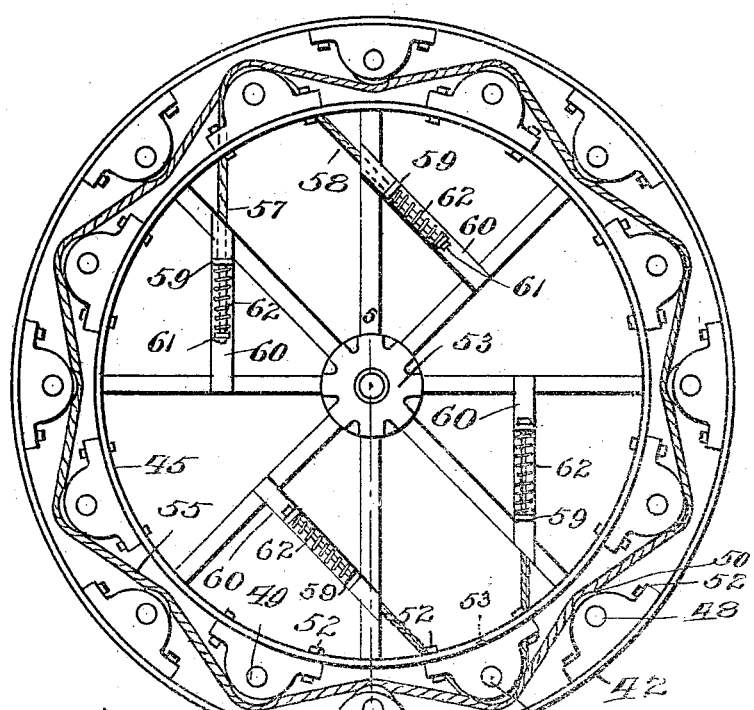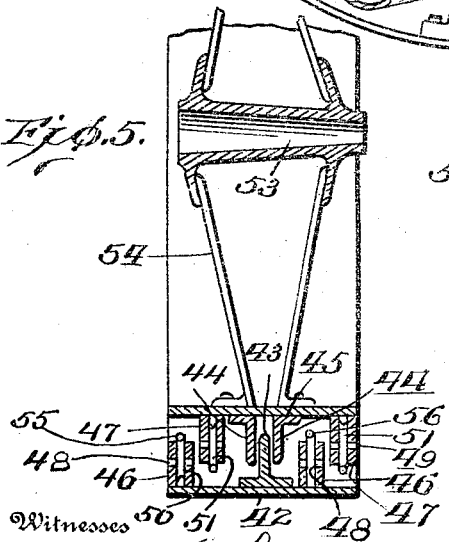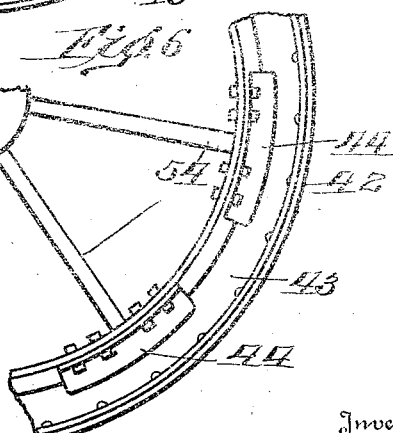

UNITED STATES PATENT OFFICE.

WILLIAM E. PORTER, OF TACOMA, WASHINGTON.

CUSHIONED WHEEL.

1,295,593. Specification of Letters Patent. Patented Feb. 25, 1919.

Application filed June 29, 1916. Serial No. 106,617.

*To all whom it may concern:*

Be it known that I, WILLIAM E. PORTER, a citizen of the United States, residing at Tacoma, in the county of Pierce and State of Washington, have invented certain new and useful Improvements in Cushioned Wheels, of which the following is a specification.

This invention relates to certain new and useful improvements in resilient wheels and in tensioning devices therefor.

The present invention has for its objects among others to provide a simplified and improved resilient wheel, of few parts embodying a cable or cables interposed between the inner and outer rims of the wheel, coöperating with rollers on said rims, and tensioning devices for the cable or cables disposed within the inner rim.

The invention as herein disclosed is applicable to wheels of various characters for different purposes, being herein illustrated as applied to a railway car wheel and also to a wheel adapted for automobiles or other road vehicles.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a side elevation of a railway car wheel constructed in accordance with the present invention.

Fig. 2 is a section on the line 2—2 of Fig. 1.

Fig. 3 is a sectional detail showing a modified form of bearing for the axles of the rollers.

Fig. 4 is a side elevation of a wheel designed for automobiles and the like and embodying the present invention.

Fig. 5 is a section on the line 5—5 of Fig. 4, parts being omitted.

Fig. 6 is a detail in elevation with the rollers and cables on one side removed.

Like numerals of reference indicate like parts throughout the different views.

Referring to the drawings, first, Figs. 1 and 2, 1 designates the outer rim or flanged portion of the wheel having the inwardly extended annular rib 2.

3 is the inner annular rim and between the members 1 and 3 there are disposed an annular series of rollers alternately arranged, and secured to the adjacent inner and outer faces respectively of the members 1 and 3 are the bearings for the shafts of these rollers. 4 designates bearings which are secured to the inner face of the outer rim 1 by means of bolts or the like 5, the said bearings each having a tenon or projection 6 engaging in a corresponding recess or depression 7 in the adjacent face of its rim, as seen clearly in Figs. 1 and 2. Each of these bearing members has a pair of ears or lugs 8 in which is mounted to revolve a shaft or axle 9 carrying a roller 10.

To the outer face of the inner rim or annular member 3 there are secured by means of bolts 11 bearings 12 in the ears 13 of which are mounted the shafts or axles 14, each of which carries a roller 15. Upon reference to Figs. 1 and 2, it will be noted that the rollers 10 and 15 are alternately disposed, that is the rollers 15 are arranged in the spaces between adjacent rollers 10, and these rollers 15 are preferably of less diameter than the rollers 10, as seen in Figs. 1 and 2. The bearings 12 are provided with tenons or the like 16 which engage in corresponding openings or depressions in the outer face of the annular member 3, as seen clearly in Fig. 1. These tenons, upon both the bearings 4 and 12, serve to prevent any movement of the bearings annularly or circumferentially of the rims.

Upon reference to Fig. 2, it will be noted that there are two sets of rollers, one upon each side of the inwardly extending flange member 2, and upon each set of rollers there is disposed a cable 17, upon one side, and 18 upon the other side, as seen clearly in Fig. 2. Each cable is passed between the rollers 10 and 15, as seen clearly in Fig. 1, the ends of the cables each passing in opposite directions over one roller and these ends 19 and 20, see Fig. 1, are attached to a tensioning device now to be described. For insuring greatest strength, it is preferred to make the bearing which supports the roller 21 over which the crossed ends of the cables pass, sufficiently large, as seen at 22 in Fig. 1, to support not only the said roller 21, but the two rollers 15 next adjacent, one upon each side of said roller 21, as shown clearly in Fig. 1.

The form of tensioning device shown in

Fig. 1 is constructed as follows: Surrounding the hub 23 are the curved arms 24 and 25, the crossed ends 26 and 27 respectively of which have secured thereto the ends 20 and 19 of the cables. These curved arms at the point of crossing of their ends are pivotally mounted upon a stud or the like 28, a washer or collar 29 and cotter pin 30 or the like being provided to prevent separation, yet allow freedom of pivotal movement of the arms 24 and 25 on the stud 28. The other ends of the arms 24 and 25 are provided with the parallel extensions 31 and 32, through openings in which loosely pass the pins 33 and 34, as seen in Fig. 1. One end of each of these pins is mounted for pivotal movement on a stud 35, and the other end of each of these pins carries a nut 36, there being springs 37 around said pins and disposed between the members 31 or 32 and the said nuts 36. Adjustment of these nuts regulates the tension of the springs.

In some instances I may form the bearing for the shafts of the rollers, as seen in Fig. 3, wherein the bearing 38 is shown as provided with the projection or tenon 39 engaging a corresponding recess 40 in the adjacent rim 3, the bearing being what might be called a double bearing, having the two sets of shaft-receiving openings 41. Generally, however, it will be found advisable to make the bearing as shown at 4 in Fig. 1.

Figs. 4 and 5 show a different form of wheel in which, however, the essence of the invention as above described in connection with Fig. 1 is the same. In this form the outer rim 42 is provided with the central inwardly extending flange 43 which is disposed between the flanges 44, 44 of the inner rim or annular member 45. The bearings 46 and 47 for the shafts or axles 48 and 49 of the rollers 50 and 51 are secured in position by bolts 52 and are provided with tenons 53' similar to the tenons above described in connection with the bearings shown in Figs. 1 and 2 and for a like purpose.

53 is the hub and 54 the spokes connecting the same with the inner annular member 45.

55 and 56 are cables, there being two in number upon each side of the center of the wheel, as seen clearly in Fig. 5. As these are all alike in their construction, arrangement and mode of operation, a description of one will suffice for all. As seen in Fig. 4, the ends 57 and 58 of each cable pass through suitable guides 59 on braces or supports 60 secured to adjacent spokes and upon the end of each member 57 and 58 is a nut 61, between which and the guide 59 is a spring 62. Adjustment of the nuts 61 regulates the tension of the springs 62 in a similar manner to the construction shown in Fig. 1 and hereinbefore described. It is to be understood that each cable has its own independent tensioning device and hence all of the tensioning devices work independently of the others.

The operation will be readily understood from the foregoing description and a detailed statement thereof is not deemed necessary.

Modifications in details, proportion of parts, etc., may be resorted to without departing from the spirit of the invention or sacrificing any of its advantages.

What is claimed as new is:—

1. In a resilient wheel, an outer rim having an inwardly extending annular guide flange, an inner rim disposed within the outer rim, two sets of bearings secured to the inner rim upon opposite sides of the guide flange, two sets of bearings secured to the outer rim and disposed upon opposite sides of the guide flange and alternately arranged with respect to the first named bearings, rollers secured to the bearings, cables engaging the co-acting rollers, crossing arms pivotally connected with the inner rim and having their crossing ends secured to the ends of the cables and having their opposite ends apertured, bolts pivotally connected with the inner rim and extending through the apertured ends of the arms, nuts having screw threaded engagement with the bolts, and springs surrounding the bolts and confined between the arms and the nuts.

2. In a resilient wheel, an outer rim having an inwardly extending annular guide flange, an inner rim disposed within the outer rim, two sets of bearings secured to the inner rim upon opposite sides of the guide flange, two sets of bearings secured to the outer rim upon opposite sides of the guide flange, rollers secured to the bearings, cables engaging the rollers, crossing arms pivotally connected with the inner rim and having corresponding ends connected with the cables, and yielding means engaging the opposite ends of the arms to oppose their movement in one direction.

In testimony whereof I affix my signature.

WILLIAM E. PORTER.